Patented Apr. 17, 1945

2,374,081

UNITED STATES PATENT OFFICE 2,374,081

POLYMERIZED ALLYL ESTERS

Russell Tattershall Dean, Stamford, Conn., assignor to American Cyanamid Company, New York, N. Y., a corporation of Maine No Drawing. Application September 30, 1941, Serial No. 413,047

10 Claims. (Cl. 260—80)

This invention relates to polymeric esters and their production.

An object of this invention is to provide polymers of monocarboxylic acid esters of allyl or methallyl alcohols.

Another object of this invention is to provide a process for the preparation of new polymeric materials.

Still another object of my invention is to provide resinous materials suitable for modification of cellulose acetate or other cellulose esters or cellulose ethers.

Another object of this invention is to provide modifiers for materials such as rubber hydrochloride.

A further object of my invention is to provide polymeric materials having good water resistance.

These and other objects are attained by heating an ester of a monocarboxylic acid and an allyl alcohol in the presence of a polymerization catalyst at a temperature above about 150° C.

The following examples in which the proportions are in parts by weight are given in way of illustration and not in limitation.

EXAMPLE 1

Allyl acetate is prepared by reacting acetic anhydride or glacial acetic acid with allyl alcohol in the presence of a small proportion of concentrated sulfuric acid or p-toluene sulfonic acid as an esterification catalyst. The heating is preferably carried out at about 100° C. for from one hour to several hours. The allyl acetate thus produced is distilled and it has a boiling point of about 103–104° C.

Allyl acetate containing about 1% of benzoyl peroxide is heated in a closed pressure vessel at temperatures gradually increasing from about 150° C. to about 180° C. for about five hours. The unpolymerized allyl acetate is distilled off leaving as a residue a polymeric, viscous, yellow balsam having a refractive index of 1.4784 at 25° C.

EXAMPLE 2

Allyl acetate containing about 5% of benzoyl peroxide is heated in a closed pressure vessel at a temperature gradually increasing from about 150° C. to about 185° C. for two hours and the temperature is then maintained at 185° C. for an additional 22 hours. The unpolymerized allyl acetate is distilled off leaving a substantially non-volatile polymeric material having a refractive index of about 1.4840 at 25° C. The product is light yellow in color and a yield of about 40–50% is obtained.

EXAMPLE 3

The polyallyl acetate prepared according to either of the foregoing examples is dissolved along with various cellulosic esters and ethers in suitable solvents. Films of these solutions were applied to sheet metal, air-dried for about one-half hour and baked for about 10 minutes at around 120° C. Second and third coats of the solutions are applied, followed by a final baking of about 1 hour at about 120° C. In each case the ratio of polyallyl acetate to the other material is 1:2. Coatings of such compositions contain nitrocellulose (½ sec. R. S.), low viscosity cellulose acetobutyrate, low viscosity cellulose acetate, low viscosity ethyl cellulose, and high viscosity methyl methacrylate, dry tack free. The films containing nitrocellulose do not whiten when immersed in cold water (25° C.) for 20 hours. Similarly no whitening occurs when the films containing cellulose acetobutyrate or cellulose acetate are exposed to cold water for 20 hours. The compositions containing ethyl cellulose or methyl methacrylate showed some whitening after about 20 hours. The coatings showed relatively good resistance to hot water as compared to other modifiers for the cellulosic materials or for the methyl methacrylate.

EXAMPLE 4

Methallyl acetate is heated in a closed vessel in the presence of about 2% of benzoyl peroxide at 180–200° C. for about 23 hours. A viscous polymeric material is obtained. This polymer may be used in the same manner as described in Example 3.

EXAMPLE 5

| | Parts |
|---|---|
| Lauric acid | 300 |
| Allyl alcohol | 200 |
| Toluene | 75 |
| Concentrated sulfuric acid | 1 |

These substances are placed in a reaction vessel provided with a condenser and a water trap arranged so that the essentially aqueous fraction of the condensate may be separated from the essentially non-aqueous fraction and the latter only, returned to the reaction vessel. The reaction mixture is heated for about 10 hours under reflux, the water of condensation being separated by azeotropic distillation; the toluene and excess alcohol are removed by distillation and the allyl laurate is distilled at about 15 mm. of mercury absolute pressure. The product boils at about 160–175° C.; the refractive index is 1.4391–1.4396 at 25° C., and the acid number is about 2.

Example 6

Polymerization of allyl laurate

Allyl laurate containing about 5% of benzoyl peroxide is heated in a suitable reaction vessel provided with an air-cooled condenser. The reaction vessel is surrounded by an oil bath maintained at about 185° C. for around 65 hours. The refractive index at about 25° C. is 1.4603-1.4607. Upon distillation the unreacted allyl laurate is removed leaving as a residue about 52 parts (a 63% yield) of a light brown, viscous polymeric material having a refractive index of about 1.4703 at 25° C. and a specific gravity above 0.944 at 25/15° C.

Example 7

A solution of 1 part of polyallyl laurate and 2 parts of nitrocellulose (½ sec.) is applied in the form of a film to a tin sheet. The film is air-dried for about 1 hour and then baked at about 120° C. for around 10 minutes. A clear, hard coating is obtained although the coating is somewhat softer than a coating containing only nitrocellulose.

Example 8

A film of a solution containing 2 parts of rubber hydrochloride and 1 part of polyallyl laurate is air-dried and baked for about 10 minutes at 120° C. A hard film, having good adhesion and flexibility, is obtained. As compared to films containing only rubber hydrochloride, the adhesion and flexibility are definitely improved.

Polymers of esters of methallyl alcohol and monocarboxylic acids may be prepared in the same general manner set forth in Examples 1, 2 and 5. Such polymers may be substituted for part or all of the allyl ester polymers used in Examples 3 and 8. Examples of suitable monocarboxylic acids which may be esterified with allyl or methallyl alcohols and polymerized according to my invention, are the following: propionic acid, butyric acid, valeric acid, caproic acid, heptylic acid, caprylic acid, capric acid, myristic acid, oleic acid, palmitic acid, stearic acid, as well as corresponding substituted acids, e. g., those substituted with the hydroxyl group, halogens (such as the chloride), etc. Examples of hydroxy acids include alpha hydroxy isobutyric acid, omega hydroxy-decanoic acid, etc. The monocarboxylic acid may contain one or more carbon to carbon double bonds but my invention is primarily directed to the esters of saturated monocarboxylic acids. The products formed from the esters of the unsaturated acids are quite different in properties from those produced from the esters of unsaturated acids. Polymers of the esters of the saturated acids are generally very much more adapted for use as plasticizers since the esters of the unsaturated acids tend to be less compatible with the plasticizable material. Furthermore, the esters of the unsaturated acids often polymerize to a relative brittle material.

The polymerization of the allyl or methallyl esters may be carried out at a temperature above about 150° C. I prefer to employ temperatures from about 180° C. to 200° C. although in some cases temperatures up to about 250° C. may be used. In the particular ester being polymerized be volatile at the desired polymerization temperature, the reaction may be carried out in a closed pressure vessel. The time of polymerization may vary from about one hour to several days or more, three days usually being sufficient. Any suitable polymerization catalyst may be utilized to accelerate the reaction. Examples of these include the organic and inorganic peroxides. Among the preferred catalysts there are: the acidic peroxides (e. g., benzoyl peroxide, phthalic peroxide, succinic peroxide, and benzoyl acetic peroxide), fatty oil acid peroxides (e. g., coconut acid peroxide, stearic peroxide, and oleic peroxide), alcohol peroxides (e. g., tertiary butyl peroxide) and terpene peroxides (e. g., ascaridole). An example of an inorganic peroxide is hydrogen peroxide. Still other polymerization catalysts which are especially suitable are boron trifluoride, stannic chloride, aluminum chloride, zinc chloride, etc.

Various fillers may be mixed with my resinous materials, e. g., wood flour, cellulose pulp, glass wool, mica, silk flock, cotton flock, steel wool, carborundum, paper, cloth, etc.

Compositions containing my polymeric materials may include various dyes, pigments or lakes, e. g., titanium oxide, zinc oxide, Prussian blue, ochre, lithopone, ferric oxide, toluidene red, etc.

My polymerized esters may be used with other natural and synthetic resins particularly for the purpose of modifying the properties of the resins with which the polymers are mixed. Examples of these are the cellulose esters and ethers, urea resins, phenolic resins, melamine resins, ester gum, polyhydric alcohol-polycarboxylic acid resins (particularly those modified with fatty oil acids), polymers of esters of methacrylic acid and acrylic acid, shellac, coumarone, indene resins, natural or synthetic rubber-like materials, etc.

My polymers are especially useful in coating compositions but they may also be used in adhesive compositions, textile and paper treating compositions, and the like. My polymers may be used in certain types of molding compositions as well as in casting compositions.

Coating compositions containing my polymers generally do not require the inclusion of other plasticizers but if desired other plasticizers may be included, e. g., the esters of phthalic acid or other polybasic acids, such as dibutyl phthalate, tricresyl phosphate, etc.

My invention is restricted to polymers of the allyl esters alone and does not include the very different substances obtained by copolymerizing an allyl ester with another material containing unsaturated carbon to carbon linkages.

Obviously many modifications and variations in the processes and compositions described above may be made without departing from the spirit and scope of the invention as defined in the appended claims.

I claim:

1. A process of polymerizing an ester of a saturated aliphatic monocarboxylic acid and of an allyl alcohol which includes the step of heating the ester alone at a temperature between about 150° C. and about 250° C. in the presence of a polymerization catalyst.

2. A process of polymerizing an ester of a saturated aliphatic monocarboxylic acid and of an allyl alcohol which includes the step of heating the ester alone at a temperature between about 180° C. and about 200° C. in the presence of a polymerization catalyst.

3. A process according to claim 1 wherein the polymerization catalyst is a peroxide.

4. A process of producing a polymeric material which includes the step of polymerizing an allyl ester of a saturated aliphatic monocarboxylic acid by heating said ester alone at a temperature between about 150° C. and about 250° C. in the presence of a polymerization catalyst.

5. A process of producing a polymeric material which includes the step of polymerizing a methallyl ester of a saturated aliphatic monocarboxylic acid by heating said ester alone at a temperature between about 150° C. and about 250° C. in the presence of a polymerization catalyst.

6. A process of producing a polymeric material which includes the step of heating allyl acetate alone at a temperature between about 150° C. and about 250° C. in the presence of a polymerization catalyst.

7. A process of producing a polymeric material which includes the step of heating allyl laurate alone at a temperature between about 150° C. and about 250° C. in the presence of a polymerization catalyst.

8. A polymer of a composition consisting of an ester of a saturated aliphatic monocarboxylic acid and of an allyl alcohol.

9. A polymer of a composition consisting of allyl acetate.

10. A polymer of a composition consisting of allyl laurate.

RUSSELL TATTERSHALL DEAN.